April 5, 1955
T. C. RUSH
2,705,572
GIN POLE HAYSTACKER
Filed April 23, 1952
5 Sheets-Sheet 1
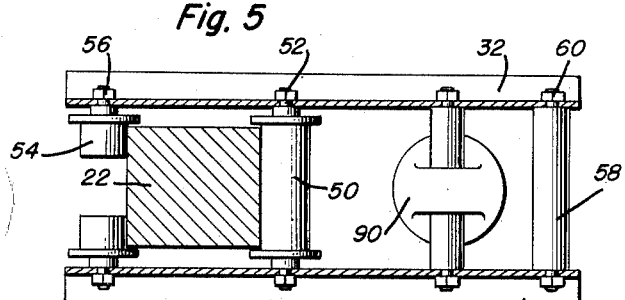
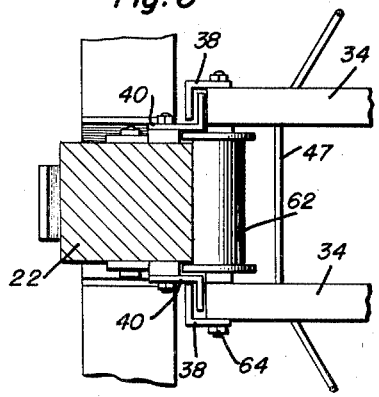
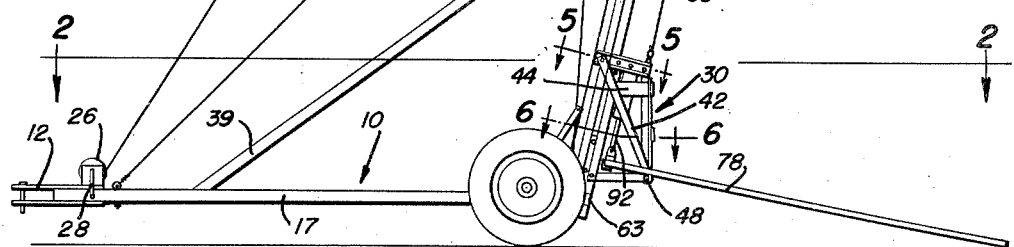
Thomas C. Rush
INVENTOR.
BY
Attorneys

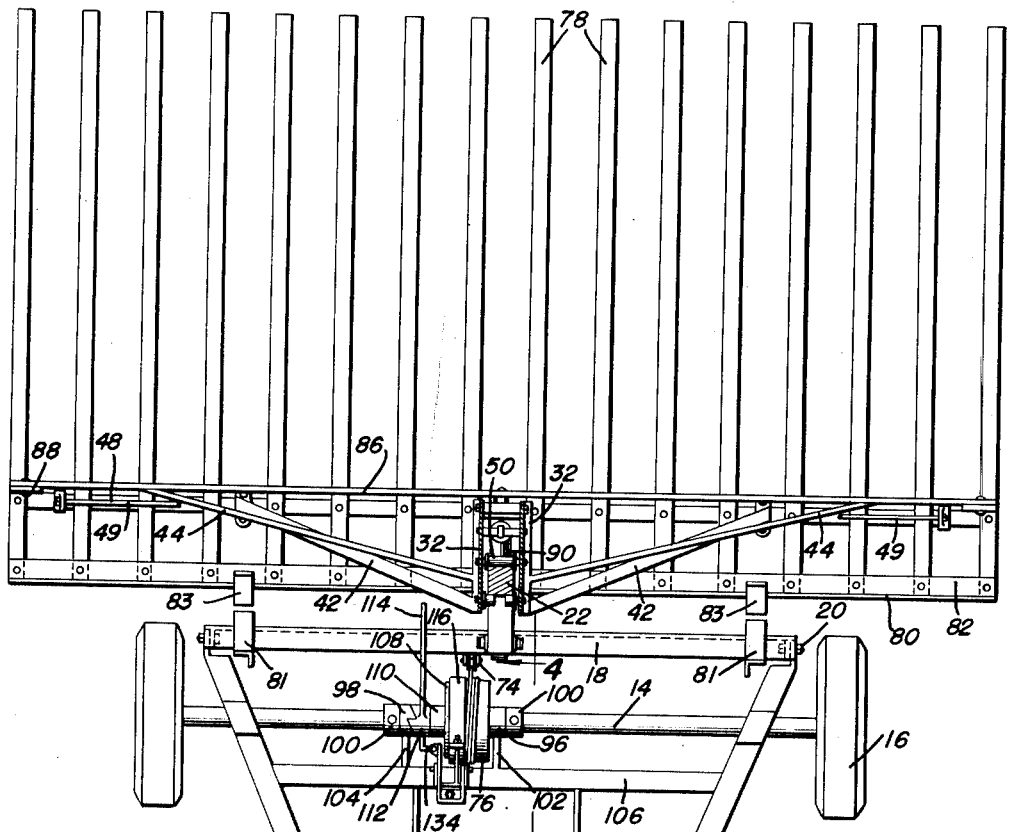

April 5, 1955  T. C. RUSH  2,705,572
GIN POLE HAYSTACKER
Filed April 23, 1952  5 Sheets-Sheet 3
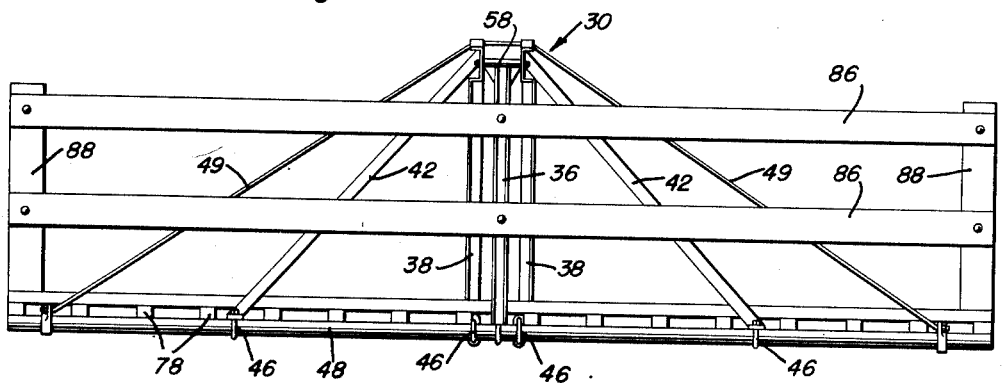
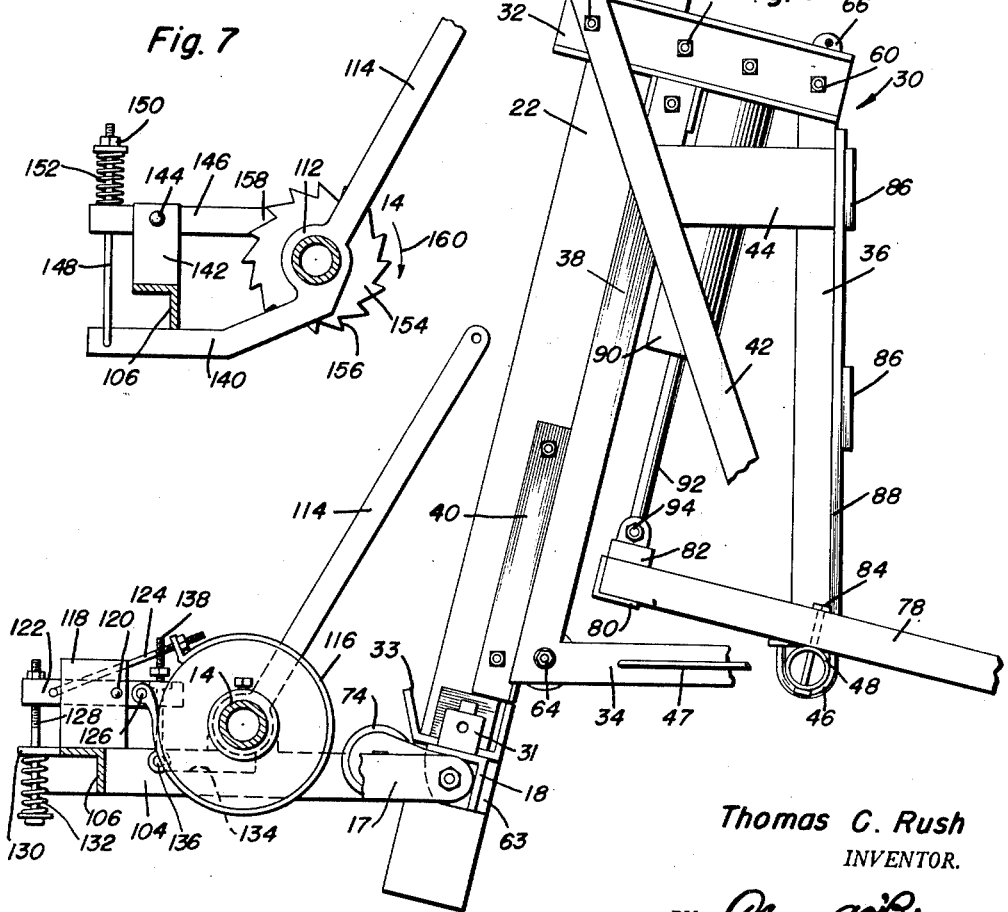
Thomas C. Rush
INVENTOR.

April 5, 1955  T. C. RUSH  2,705,572
GIN POLE HAYSTACKER

Filed April 23, 1952  5 Sheets-Sheet 4

Thomas C. Rush
INVENTOR.

BY Clarence A. O'Brien
and Harvey B. Jacobson
Attorneys

April 5, 1955
T. C. RUSH
2,705,572
GIN POLE HAYSTACKER
Filed April 23, 1952
5 Sheets-Sheet 5
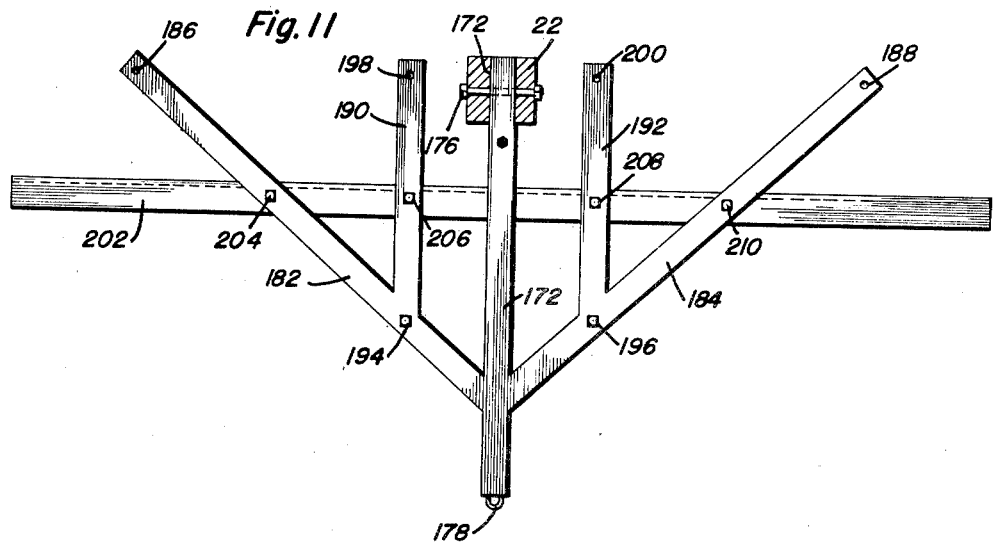
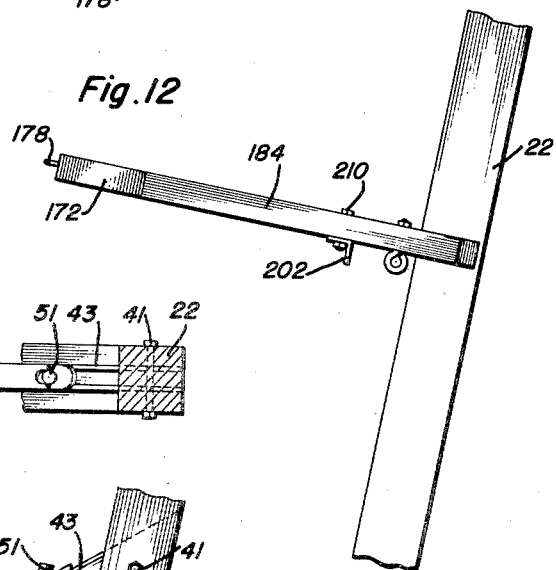
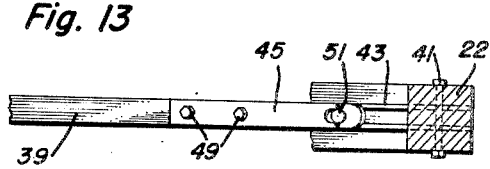
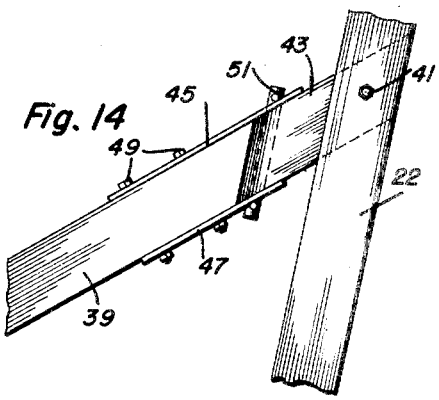
Thomas C. Rush
INVENTOR.

United States Patent Office 2,705,572
Patented Apr. 5, 1955

2,705,572

GIN POLE HAYSTACKER

Thomas C. Rush, Mansfield, Mo.

Application April 23, 1952, Serial No. 283,795

3 Claims. (Cl. 214—672)

This invention comprises novel and useful improvements in a gin pole haystacker and more specifically pertains to an apparatus for lifting hay from the ground and elevating the same to the top of a haystack.

The principal object of this invention is to provide a haystacking machine which shall be power operated and shall derive its power from the axle of the supporting wheels of the mobile frame of the apparatus.

A further object of the invention is to provide an improved haystacking machine wherein the hay fork shall have an improved sliding mounting and support upon the boom of the apparatus; and wherein improved power driving means are provided for actuating the carriage of the hay fork upon the boom, and wherein an improved brake means is provided for selectively locking the carriage and hay fork in predetermined selected positions upon the boom.

An additional important object of the invention is to provide an improved haystacking machine in conformity with the foregoing objects wherein a common control means is provided for the selective and alternate actuation of the power elevating means for the carriage and hay fork and brake means for locking the same in adjusted position.

Yet another important object of the invention is to provide an apparatus in conformity with the foregoing objects wherein the hay fork shall be mounted for tilting movement about a horizontal axis upon the carriage; together with means carried by the carriage for causing tilting movement of the hay fork.

A still further important object of the invention is to provide an improved guy line and guy line brace assembly for the boom of the haystacker.

A further object of the invention is to provide an improved construction for journaling the lower end of the boom whereby the boom will be mounted for turning movement upon its longitudinal axis, and also mounted for vertical raising and lowering about a horizontal axis.

These, together with various ancillary features and objects of the invention, which will later become apparent as the following description proceeds, are attained by the present invention, a preferred embodiment of which has been illustrated, by way of example only, in the accompanying drawings, wherein:

Figure 1 is a side elevational view of a haystacking apparatus in accordance with the principles of this invention, the same being shown with the carriage and the hay fork in the lowered position of the same preparatory to gathering a quantity of hay upon the fork and elevating the same to the top of a haystack;

Figure 2 is a horizontal sectional view, taken substantially upon the plane of the section line 2—2 of Figure 1, certain of the cables and guy wires being omitted from this view in the interest of simplicity of illustration;

Figure 3 is a front elevational view of the carriage, hay fork, fork backboard and certain bracing members forming a part of the invention;

Figure 8:
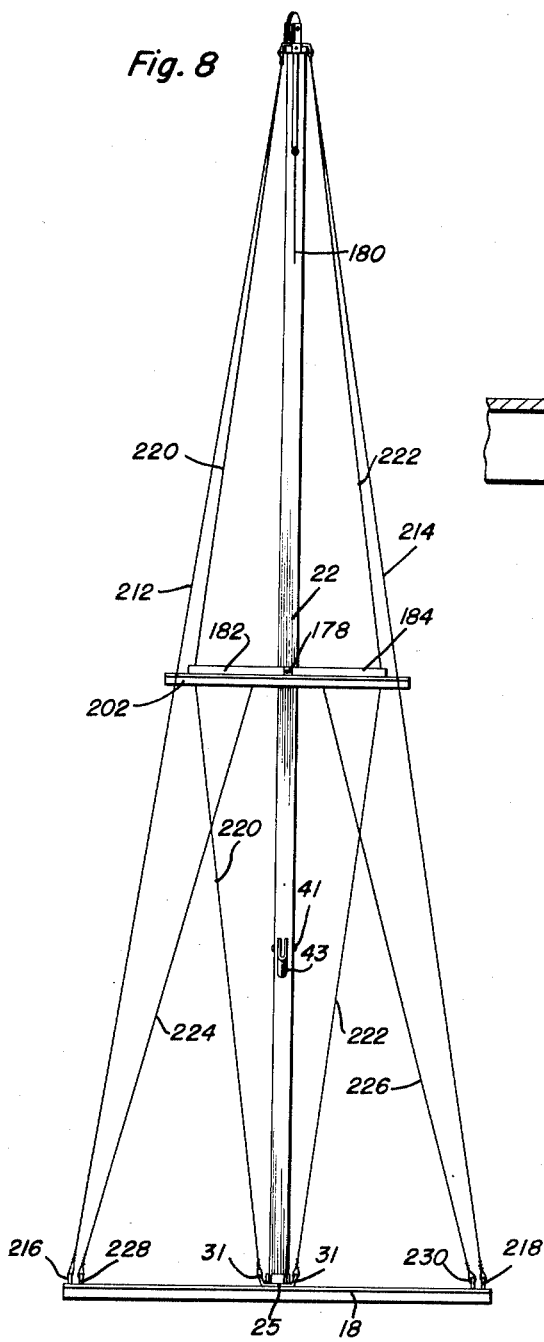
Figure 9:
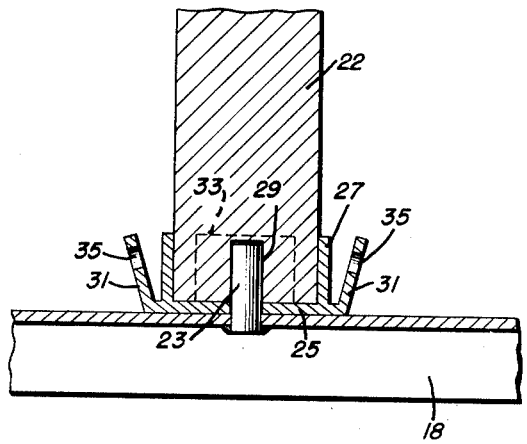
Figure 10:
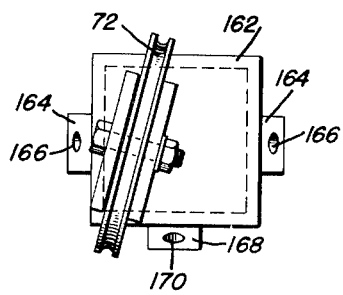

Figure 4 is an enlarged elevational detail view of a portion of Figure 1, parts being broken away, and showing certain details of the carriage in its lowered position upon the boom, a part of the hay fork tiltingly mounted upon the carriage together with the operating means for tilting the fork, and showing a part of the power operating means for elevating the carriage and for locking the same in vertically adjusted position;

Figure 5 is a horizontal sectional detail view taken upon an enlarged scale substantially upon the plane indicated by the section line 5—5 of Figure 1 and showing the manner in which the upper portion of the carriage is guidingly mounted upon the boom for sliding movement longitudinally thereof, certain cables and guy wires being omitted from this view;

Figure 6 is a horizontal sectional detail view taken upon an enlarged scale substantially upon the plane indicated by the section line 6—6 of Figure 1, parts being omitted, and showing the manner in which the lower portion of the carriage is guidingly mounted upon the boom;

Figure 7 is a fragmentary vertical elevational detail view of a slightly modified construction of the control mechanism for elevating the carriage;

Figure 8 is a rear elevational view of the boom showing the guy line and guy line brace assembly of the same, certain elements being broken away and omitted in the interest of simplicity of illustration;

Figure 9 is a fragmentary detail view upon an enlarged scale and taken in vertical section of the pivotal mounting of the boom upon its support member;

Figure 10 is a top plan view of a pulley crown block mounted upon the top of the boom;

Figure 11 is a top plan view of the guy line brace, the attachment of the brace to the boom being shown in horizontal sectional view;

Figure 12 is a side elevational view of the brace and a portion of the boom as shown in Figure 11;

Figure 13 is a fragmentary horizontal sectional detail view showing a portion of a brace construction of the boom; and, Figure 14 is a side elevational view of the brace construction of Figure 13.

The present invention relates to a similar apparatus to that shown in the prior patent of Frederick L Willrodt, No. 2,372,870, patented April 3, 1945. In said prior patent, a carriage containing a tiltable hay fork was mounted upon a boom carried by a mobile platform secured to the front end of a tractor, the carriage being raised or lowered by means associated with the power take-off of the tractor. The present invention essentially distinguishes from the Willrodt patent in that the power operating means for elevating the carriage is derived in a novel and improved manner from the axle which supports the mobile frame rather than from the power take-off of the tractor imparting mobility to the frame; and by a novel guy wire and guy line brace construction.

Referring now more specifically to the accompanying drawings, wherein like numerals designate similar parts throughout the various views, it will be seen that the numeral 10 designates generally a mobile frame of any desired character, and which is provided with a coupling hitch 12 adapted to be secured to the front part of a tractor whereby the device may be pushed by a tractor during its operation. The mobile frame is provided with a transversely disposed supporting axle 14 which is rotatably journaled upon the frame and which is provided with the supporting wheels 16 secured thereto. As set forth hereinafter, rotation of the axle 14 when the frame is being pushed by a tractor is relied upon to supply the power for operating and elevating the hay fork upon the boom of the apparatus, although a separate source of power may be utilized if desired.

It is to be understood that the mobile frame 10 may be of any desired construction, and since the principles of this invention are not limited to any particular construction of frame, a detailed explanation of the frame and its component members is deemed to be unnecessary. As illustrated however, the frame is of a generally triangular shape having side members 17, with its apex being adapted to be secured to the front portion of a tractor, and with its base or forward end being provided with a transverse beam 18 which constitutes a support and which at its ends is hingedly connected as by bolts or the like 20 to the frame 10 for swinging movement about a horizontal axis extending transversely of the frame and at the forward end of the same.

Supported upon the midportion of the transverse beam 18 is a boom 22 which is pivoted for rotation about its longitudinal axis. This pivotal mounting of the boom is more clearly brought out in Figure 9 wherein it will be seen that the transverse beam 18 which is of angle iron construction has secured as by welding or the like at its midportion an upstanding pivot pin 23. Rotatably surrounding this pivot pin and resting upon the top surface of the transverse beam 18 is a plate 25 having upstanding sides 27 forming a socket for receiving the lower end of the boom 22, this lower end of the boom further having a centrally disposed bore 29 therein for rotatable reception of the upstanding pin 23. It will thus be apparent that the boom, received within the socket member 27 upon the plate 25 is rotatable with that socket upon the transverse beam 18, being centered by the pivot pin 23 engaging in the bore 29. The plate 25 is further provided with upstanding projections 31 at opposite sides of the boom, together with a further upstanding projection 33 shown in dotted lines in Figure 9 and which is disposed upon what may be termed the rearward side of the boom. Each of these projections is apertured as at 35 for the reception of guy wires as set forth hereinafter. It will thus be apparent that the boom is supported upon the transverse beam both for rotation about the longitudinal axis of the boom upon the pin 23 carried by the beam; and also for rotation with the transverse beam about a horizontal axis which passes through the fastening bolts 20.

By referring to Figure 1, it will be noted that an adjusting cable 24 has its lower end secured to a winch 26 provided with a hand crank or the like 28 and mounted upon the rear portion of the frame 10, the other end of this cable being secured in any suitable manner to the upper end of the boom. By this means, the boom may be raised or lowered in order to facilitate assembling or disassembling of the associated mechanism and servicing of the same. This raising or lowering of the boom will of course result in a rotation of the support member about the horizontal axis through its pivot means 20, and will enable the boom to be disposed upon the ground or in the raised position shown in Figure 1.

A stiffener 25 in the form of a resilient member is secured to the top of the boom and to the cable 24, being fastened rigidly to the cap piece 162 or directly to the boom 22, to stabilize the longitudinal sway of the boom.

As shown in Figure 2, a transverse frame member 37 extends between the side frame members 17 of the frame 10, and a rigid brace member 39 is secured to substantially the midportion of the transverse member 37 in a rigidly fixed manner. The rigid brace member 39 is detachably coupled to the boom 22 for rigidly bracing the same. This coupling arrangement is shown in Figures 1, together with 13 and 14. Rigidly and fixedly secured to the boom 22 as by a fastening bolt 41, is an arm 43 which may conveniently comprise a U-shaped member as shown in Figure 8. The upper end of the member 39 is provided with a pair of plates, shown at 45 and 47, and bolted thereto as at 49, which plates embrace the U-shaped member 43 and is pivotally and detachably connected thereto as by a pin 51 extending through the U-shaped member and through aligned apertures in the plates 45 and 47.

It will thus be seen that when the boom is in its raised position, the coupling pin 51 may be inserted through the apertures of the plates 45 and 47 and through the U-shaped member 43 to secure these parts together whereby the brace member 39 will reinforce and strengthen the mounting of the boom upon the apparatus. However, when it is desired to lower the boom, the coupling pin 51 may be withdrawn, and the windlass 26 and cable 24 may be loosened to allow the boom to swing downwardly to its lowered position.

Indicated generally by the numeral 30 is a carriage which is slidably mounted upon the boom for movement longitudinally or axially thereof. The construction of this carriage and its mounting means upon the boom are disclosed more clearly in Figures 4–6. The carriage consists of a pair of parallel channel iron members 32 which form the upper part of the same, while the second pair of angle iron or channel members 34 form the lower portion thereof. The members 32 and 34 are rigidly connected to each other by an interposed angle iron member 36 at what may be termed the outer face of the carriage, and by a pair of angle iron members 38 at the rear face of the carriage, the latter members constituting a pair of guide members which are slidingly received upon a second pair of angle iron guide members 40 which are secured to opposite sides of the boom 22 adjacent its lower end.

This relationship of the guide members 38 and 40 is clearly shown in Figure 6.

Additional rigidity is imparted to the carriage 30 by brace rods or brace members 42 which are connected to the members 32 at the upper corners of each side of the carriage, together with additional brace members 44 secured to the members 38 and to the fork assembly as shown in Figures 1, 2 and 4.

At its lower outer ends, the carriage has secured thereto and journaled thereon for rotation by means of U-bolts 46, a shaft 48. An additional brace rod 47, see Figure 6, is connected to the bottom carriage members 34 and is secured to the shaft 48 by U-bolts 46. Similarly, a brace rod 49, see Figures 2 and 3, is clamped to the upper carriage members 32 and is secured to the shaft 48 adjacent its ends. The purpose of this shaft will be set forth hereinafter.

As will be now more readily apparent from Figure 5, it will be seen that the upper carriage members 32 loosely embrace opposite sides of the boom 22. Roller means are provided journaled on and carried by the members 32 for bearing upon the front and rear surfaces of the boom 22. These rollers comprise a forward roller 50 journaled between the side members 32 as by an axial bolt 52, this roller being adapted to bear upon the front face of the boom 22, while a pair of flanged pulley wheels 54 are journaled upon each of the members 32 upon the inner surface of the same in cantilever fashion as by bolt axles 56, these pulleys bearing against the rear surface of the boom 22. It will thus be apparent that the upper frame members 32 of the carriage are secured to the boom longitudinally thereof, and having a roller bearing engagement with both the front and rear surfaces of the boom thus retaining the upper portion of the carriage in guided relation upon the boom for movement longitudinally thereof.

At their other ends, the upper members 32 of the carriage are secured to each other in spaced relation as by a spacer sleeve 58 and a fastening bolt 60 extending therethrough. This bolt 60 may further serve to attach the member 36 to the members 32 as shown in Figure 4. In a similar manner, the bolt stub axles 56 may be utilized to attach the upper ends of the brace members 42 to the members 32.

Referring now to Figure 6 it will be seen that the lower members 34 of the carriage are similarly provided with a roller 62 which is journaled therebetween as by a bolt 64 forming an axle therefor, this roller bearing upon the front face of the boom 22, and the bolt axle 64 being likewise utilized as a means for attaching the members 34 to the members 38.

It will now be apparent that while the upper portion of the carriage is secured by the rollers 50 and 54 to the front and rear surfaces of the boom, the lower portion bears against the boom by the roller 62 at the front surface of the boom, and is prevented from moving away from the boom by the guide members 38 and 40.

It is preferred to provide an extension 63, see Figures 1 and 4, which is welded to the member 18. This extension forms a continuation of the track surface of the boom 22 upon which the roller 62 (see Figure 6) of the carriage travels when the rake is in its lowered poistion, resting upon the ground.

As shown best in Figure 4, an apertured lug 66 is secured to the upper members 32 of the carriage and is adapted to receive one end portion 68 of an elevating cable 70 which is entrained over a pulley block 72 mounted on top of the boom, and its other end portion, after being entrained over a guide pulley 74, see Figures 2 and 4, which is mounted upon the support 18, and is operatively connected to a drum or winch 76, manually operated and mounted in a manner to be set forth hereinafter.

It will now be apparent that by manipulating the cable 70, through the winch 76, that the carriage 30 may be raised upon the boom, and may be lowered under its own weight by slacking off upon the cable.

As shown in Figure 2, the transverse member 18 is provided with a pair of angle iron stop members 81 which are fixedly secured thereto, and which cooperate with similar angle iron stop members 83 carried by the members 80 and 82 of the rake assembly. These members, when the rake is in its lowered position, are adopted to abut or engage to prevent undue horizontal swinging movement of the rake assembly.

A hay fork is tiltingly mounted upon the carriage for movement therewith and for tilting movement thereon. This hay fork includes a plurality of parallel teeth 78, which at their rear ends are secured between a transversely extending angle iron support member 80 and a transverse beam 82, clamped or secured to each other in any desired manner. Adjacent their rear ends, the rake teeth 78 are attached to the above mentioned shaft or pipe 48 as by bolts or the like 84, whereby the teeth may be mounted upon the shaft 48 and may be tilted therewith about a horizontal axis.

The above mentioned frame member 36 of the carriage 30 has secured thereto a plurality of parallel horizontally extending bars 86 which are provided with suitable vertical members 88 and which constitute an open framework comprising the back of the rake assembly. The above mentioned brace members 44 serve to rigidly brace and reinforce the backboards of the rake assembly by their attachment to the transverse backboard members 86 and the carriage members 88. In addition, the previously mentioned brace rods 42, 49 also serve to brace and journal the rake fulcrum shaft 48 by means of U-bolts constituting hinges 46. This rake back is fixedly supported by the carriage and is immovable thereon, while the rake teeth are tiltably mounted upon the carriage by means of the shaft 48 journaled in the above mentioned U-bolts 46.

A power operating means is provided for controllably tilting the rake fork upon the carriage. This power means may conveniently comprise a cylinder 90 having a piston therein not shown, provided with a piston rod 92 which is pivotally connected to the transverse beam 88 of the rake tooth assembly as by a pivot pin 94. The cylinder and piston construction may consist of any conventional fluid pressure operated mechanism whereby the tilting movement of the rake teeth may be positively effected. This construction enables the teeth to be tilted to a downward position as shown in Figure 1 when it is desired to use the rake to scoop up grass or the like; permits the teeth to be then tilted to a horizontal position or a slightly upwardly inclined position when it is desired to lift or elevate the gathered hay to the top of a stack; and the teeth may then be tilted downwardly to permit the hay to slide or drop from the rake upon the stack.

Attention is now directed more specifically to Figures 2 and 4 for an understanding of the power operated mechanism whereby the rotation of the axle 14 is utilized to operate the winch 76 and thus raise or lower the rake carriage.

The winch 76 is loosely rotatably journaled upon the axle 14, between a pair of bushings 96 and 98. A pair of collars 100 are adjustably secured to the axle 14 on the outer sides of the two bushings as by means of set screws of the like, whereby axial movement of the axle with respect to the bushings is prevented.

It will be noted that the bushings 96 and 98 are fixedly secured as by brace rods or brackets 102 and 104 respectively to a transversely disposed bracing member 106 carried by the frame 10.

One side of the winch drum 76 is provided with an annular face constituting a clutch face which is engageable with a movable clutch member consisting of a disk 108 carried by a hub 110 which is splined to the shaft 14 for non-rotative but axially slidable movement thereon.

The adjacent surfaces of the winch drum 76 and the clutch plate 108 constitute a friction clutch of a known design whereby when these members are pressed together, the winch drum will be fixedly secured to the axle 14 for rotation therewith. Manipulation of the clutch plate is effected by means of a collar or sleeve 112 which is rotatably journaled upon the axle 14 between the clutch plate hub 110 and the sleeve or collar 98.

It will be observed that the adjacent faces of the bushing 98 and of the sleeve 112 are provided with complementary cam surfaces which are inclined with respect to the longitudinal axis of the axle 14, so that upon rotation of the member 112 relative to the member 98, an axial movement will be imparted to the member 112 thereby pressing the clutch plate 108 against the clutch face of the winch drum 76.

To effect this rotative movement of the member 112 the latter is provided with a fixedly attached handle 114 comprising a control means.

As so far described, it will now be understood that upon manipulation of the member 112 by the handle 114, the clutch will be selectively engaged or disengaged, thereby connecting the winch drum to the axle so that during movement of the mobile frame by the tractor, the rotation of the axle 14 will be utilized as a source of power for causing elevation or vertical movement of the carriage 30 longitudinally of and upon the boom 22. With the clutch released, it is evident that forward movement of the mobile frame will not elevate the carriage, but will permit the rake carried by the same to either travel along the ground thus collecting and gathering hay upon the rake; or will enable the hay to be transported when the carriage is in an elevated position upon the boom as set forth hereinafter.

A brake band 116 embraces a portion of the winch drum 76 which thus constitutes a brake for the drum. This brake band may be of any desired character, and may be actuated in any desired manner, and serves to lock the winch drum and consequently serves to maintain the carriage in various vertically adjusted positions upon the boom. However, it is preferred to provide a common control means associated with the handle 114, whereby the clutch and the brake band may be selectively operated alternately to thus readily control the elevating of the carriage to any desired portion of the boom, and to lock the carriage at that portion.

For that purpose, the transverse bracing member 106 is provided with a pair of upstanding plates 118 which constitute fulcrums for supporting as by a pivot 120, a lever member 122 therebetween. Opposite ends of this lever member are connected as by the adjusting screw 124 and the pivotal connection 126 with opposite ends of the brake band 116, whereby tilting of the lever member 122 will selectively tighten or loosen the brake band upon the winch drum braking surface. An adjusting bolt 128 is connected to one end of the lever 122, and extending through a lug 130 carried by the member 106, is engaged with a surrounding compression spring 132 to thereby yieldingly urge the lever member in a direction to cause tightening of the brake band. The spring best serves to maintain the brake band in its locked position, to thereby adjustably secure the carriage at selected elevations upon the boom.

As shown in Figure 2, the collar 112 to which the handle 114 is attached is provided with an oppositely extending L-shaped lever arm 134, see Figure 4, which is pivoted at 136 to an adjusting rod 138 attached to one end of the lever member 122. As will be seen by Figure 4, the lever may be moved into opposite positions to selectively engage the clutch and release the brake; or disengage the clutch and apply the brake.

In place of the brake construction of Figures 2 and 4, a ratchet construction for performing the same function may be employed, as disclosed in Figure 7. As before, the handle 114, attached to the collar or sleeve 112, is utilized to operate the lever arm 140 which corresponds to the previously mentioned lever arm 134. A plate or other fulcrum support 142 carried by the member 106 pivotally supports as by a pivot 144, a lever 146 which comprises a latch or ratchet dog. The other end of this lever has an adjusting rod 148 extending therethrough, the lower end of this rod being pivotally connected to the end of the lever arm 140, and the upper end of this rod having an adjusting nut 150 thereon, by means of which a compression spring 152 may be adjustably tensioned. Secured to the winch drum 76 is a ratchet wheel 154 having ratchet teeth 156. The dog 146 is provided with a pointed nose 158 which is engageable with the teeth 156.

The arrangement of this embodiment is such that when the lever 114 is moved to the position for engaging the clutch, whereby the drum and the ratchet wheel 154 will be caused to rotate in the direction indicated by the arrow 160 in Figure 7, the lever arm 140 will rotate in a counter-clockwise direction thereby tensioning the spring 152 and yieldingly applying the tension upon the dog 146. Consequently, when the drum and therefore the ratchet wheel 154 begin to rotate, the spring will cause the dog to be pivoted away from the ratchet wheel and maintained away from the ratchet wheel as long as the clutch is engaged. However, when the handle 114 is moved in a clockwise direction, thereby disengaging the clutch, the tension on the spring 152 will be released thereby permitting the dog 146 and its nose 158 to again engage the ratchet wheel 154, thereby preventing reverse movement of the winch drum and thereby securely holding the carriage in its elevated position. It will thus be seen that the operation of the common control means, the lever 114, performs the same functions in either embodiment, but by a ratchet wheel or dog in the second embodiment of Figure 7, and by a brake drum and shoe in the first embodiment of Figure 4.

For an understanding of the guy line brace assembly, attention is now directed more specifically to Figures 1, 8–12. A crown plate 162 constitutes a cap for the top end of the pole 22, this crown plate being provided upon its sides with a pair of depending lugs or ears 164 which are apertured as at 166. Upon its rear side, the crown plate 162 is provided with a depending ear 168 apertured as at 170. It will be noted that these three ears with their apertures correspond to the previously mentioned lugs 31 and 33 of the bed plate 25 upon which the lower end of the pole is mounted. The above mentioned crown pulley 72 is supported and extends above the crown plate 162.

At any convenient position intermediate its ends, the rear side of the pole 22 is provided wtih a perpendicular, rearwardly extending rigid brace member 172 which as shown in Figure 12 is secured in a lateral socket 174 in the rear side of the pole 22. A fastening bolt 176 serves to rigidly attach the member 172 to the pole, as shown in Figure 11.

The brace 172 upon its outer end is provided with an eye bolt 178 and a cable 180 is secured through the aperture 170 of the ear 168 of the crown block at the top of the pole, passes through the eye bolt 178, and is then secured to the aperture in the lug 33 of the base plate 25 upon which the pole rests. This cable is tightly tensioned and constitutes a tension member to strengthen and reinforce and rigidify the gin pole 22.

The brace 172 is provided with a pair of integral, divergent arms 182 and 184, see Figure 11, which at their rear ends are apertured as at 186 and 188. A second pair of arms 190 and 192 are attached at one end to the arms 182 and 184 respectively as by bolts 194 and 196, these arms likewise having their other ends apertured as at 198 and 200. The apertured ends of the arms 182, 184, 192 extend in substantially a straight line which extends transversely through the pole 22. A cross arm 202 is secured to each of the other arms above mentioned as by bolts 204, 206, 208 and 210. A pair of guy lines 212 and 214 are respectively attached at their upper ends to the apertured ears 164, and extend downwardly to the cross member 18, being attached to eye bolts 216 and 218 respectively. These lines serve to brace and support the gin pole during its operation. A second pair of guy lines 220 and 222 are likewise attached at their upper ends to the apertured ears 164, passed through the apertures 186 and 188 of the arms 182 and 184, and at their lower ends are attached to the apertured lugs 31 previously mentioned. This pair of lines serves to strengthen and rigidify the gin pole against lateral deflection during its operation.

Finally, a third pair of lines 224 and 226 are attached at their upper ends to suitable bolts or the like by means of the apertures 198 and 200 on the arms 190 and 192, while their lower ends are secured to eye bolts or other fasteners 228 and 230 carried by the transverse member 18 adjacent its ends. It will thus be seen that there is provided a very rigid guy line and brace construction to reinforce, strengthen and rigidify the gin pole during its operation.

From the foregoing, the construction and operation of the device will be readily understood and further explanation is believed unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to, falling within the scope of the appended claims.

Having described the invention, what is claimed as new is:

1. In a hay stacking machine comprising a mobile frame, a transverse beam pivotally secured to said frame at its ends, a plate mounted intermediate the ends of said beam, a pin projecting upwardly from said plate, a boom having a socket in its lower end rotatably receiving said pin, a rigid brace connecting said boom to said frame to prevent movement of said beam and said boom relative to said frame and to prevent movement of said beam and said boom relative to one another, means detachably connecting said brace to said beam, and a carriage longitudinally slidable on said beam, said connecting means including a U-shaped member secured to said boom and having its bight portion spaced rearwardly from said boom, said brace including a pair of longitudinally projecting, spaced plates receiving said bight portion therebetween and having aligned apertures therein, a pin passing through said apertures and retaining said bight portion between said plates.

2. A haystacking machine comprising a mobile frame, an elongated boom on said frame, means connecting said boom to said frame preventing swinging movement of said boom, a carriage traversing said boom, said boom having front, rear and side faces, rollers on said carriage bearing upon the front and rear surfaces of said boom, angle iron members on opposite sides of said boom and angle iron members on opposite sides of said carriage slidably embracing said first mentioned angle iron members.

3. A hay stacking machine comprising a mobile frame, an elongated boom on said frame, means connecting said boom to said frame preventing swinging movement of said boom, a carriage traversing said boom, said boom having front, rear and side faces, rollers on said carriage bearing upon the front and rear surfaces of said boom, angle iron members on opposite sides of said boom and angle iron members on opposite sides of said carriage slidably embracing said first mentioned angle iron members, said connecting means including a U-shaped bracket secured to said boom and having its bight portion spaced rearwardly from said boom, a brace extending upwardly from said frame, said brace including a pair of longitudinally projecting spaced plates receiving said bight portion therebetween and having aligned apertures therein, a pin passing through said apertures and retaining said bight portion between said plates.

References Cited in the file of this patent

UNITED STATES PATENTS

| Number | Name | Date |
|---|---|---|
| 355,119 | Barley et al. | Dec. 28, 1886 |
| 864,472 | Kouns | Aug. 27, 1907 |
| 938,076 | Robben | Oct. 26, 1909 |
| 1,860,222 | Billings | May 24, 1932 |
| 2,099,604 | Gunning | Nov. 16, 1937 |
| 2,372,870 | Willrodt | Apr. 3, 1945 |
| 2,427,301 | Puim | Sept. 9, 1947 |
| 2,437,010 | Way | Mar. 2, 1948 |
| 2,581,351 | Black | Jan. 8, 1952 |
| 2,652,164 | Tipps | Sept. 15, 1953 |